(12) United States Patent
Ushikubo

(10) Patent No.: US 11,212,418 B2
(45) Date of Patent: Dec. 28, 2021

(54) IMAGE PROCESSING APPARATUS AND IMAGE PROCESSING METHOD WITH DESTINATION IDENTIFIER USED TO ESTABLISH WIRELESS COMMUNICATION

(71) Applicant: Oki Electric Industry Co., Ltd., Tokyo (JP)

(72) Inventor: Yuichi Ushikubo, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 17/017,838

(22) Filed: Sep. 11, 2020

(65) Prior Publication Data

US 2021/0092256 A1 Mar. 25, 2021

(30) Foreign Application Priority Data

Sep. 25, 2019 (JP) .............................. JP2019-174705

(51) Int. Cl.
*H04N 1/34* (2006.01)
*H04N 1/00* (2006.01)
*G06F 3/12* (2006.01)

(52) U.S. Cl.
CPC ........... *H04N 1/344* (2013.01); *G06F 3/1204* (2013.01); *G06F 3/1231* (2013.01); *G06F 3/1287* (2013.01); *H04N 1/00307* (2013.01); *H04N 1/00644* (2013.01)

(58) Field of Classification Search
None
See application file for complete search history.

(56) References Cited

U.S. PATENT DOCUMENTS

| 2012/0147436 A1* | 6/2012 | Nishiyama | ......... H04N 1/32096 |
| | | | 358/406 |
| 2016/0352852 A1* | 12/2016 | Yamamoto | .............. H04L 45/04 |
| 2018/0043976 A1* | 2/2018 | Nakamoto | ............ H04W 4/024 |

FOREIGN PATENT DOCUMENTS

JP 2014-089714 A 5/2014

* cited by examiner

*Primary Examiner* — Lennin R Rodriguezgonzalez
(74) *Attorney, Agent, or Firm* — Muncy, Geissler, Olds & Lowe, P.C.

(57) ABSTRACT

An image processing apparatus includes a data processing part that processes image data: a storage part that stores billing information including a plurality of wireless communication identifiers and usage histories of the data processing part, each of the usage histories being associated with wireless communication identifiers, a communication part that establishes a wireless communication associated with one of the wireless communication identifiers such that the communication part wirelessly communicates with an external device, and a control part that, when receiving an image processing job from the external device through the communication part, determines one of the wireless communication identifiers that is used to establish the wireless communication wherein the one of the wireless communication identifiers is defined as a destination identifier, controls the data processing part based on the image processing job and updates one usage history that is associated with the destination identifier.

10 Claims, 11 Drawing Sheets

| Billing Group | SSID | Last Use Date |
|---|---|---|
| 1st Group | SSID1: C841_FA52DA_A | 2019/7/16 13:57 |
| 2nd Group | SSID2: C841_FA52DA_B | 2019/7/16 08:41 |

Fig. 4

| Date | 1st Group (SSID1) | | 2nd Group (SSID2) | |
|---|---|---|---|---|
| | Color | Mono | Color | Mono |
| 2019/3 | 271 | 221 | 0 | 0 |
| 2019/4 | 525 | 331 | 231 | 1432 |
| 2019/5 | 732 | 375 | 123 | 412 |
| 2019/6 | 243 | 612 | 721 | 215 |
| 2019/7 | 321 | 557 | 231 | 842 |

Fig. 5

Network Setting/Wi-Fi Direct Comm. Setting/Billing Setting

1st Group
SSID: C841_FA52DA_A
Key: groupa_pass

2nd Group
SSID: C841_FA52DA_B
Key: groupb_pass

[Cancel] [Set]

Apparatus Management/Billing Report

Target Year: 2019 — 175  Target Month: 07 — 176

| Billing Group | SSID | Color | Mono | Last Use Date |
|---|---|---|---|---|
| 1st Group | SSID1: C841_FA52DA_A | 321 | 557 | 2019/7/16 13:57 |
| 2nd Group | SSID2: C841_FA52DA_B | 231 | 842 | 2019/7/16 08:41 |

| Billing Group | Host name | MAC Address | SSID | Last Use Date |
|---|---|---|---|---|
| 1st Group | Smith | 40:83:1D:00:00:01 | SSID1: C841_FA52DA_A | 2019/7/16 13:57 |
| 2nd Group | Johnson | 40:83:1D:00:00:02 | SSID2: C841_FA52DA_B | 2019/7/16 08:41 |

| Date | 1st Group (SSID1) | | 2nd Group (SSID2) | |
|---|---|---|---|---|
| | Color | Mono | Color | Mono |
| 2019/3 | 271 | 221 | 0 | 0 |
| 2019/4 | 525 | 331 | 231 | 1432 |
| 2019/5 | 732 | 375 | 123 | 412 |
| 2019/6 | 243 | 612 | 721 | 215 |
| 2019/7 | 321 | 557 | 231 | 842 |

Network Setting/Wi-Fi Direct Comm. Setting/Billing Setting

1st Group: Smith — 171c — 40:83:1D:00:00:01 — 171d
SSID: C841_FA52DA_A — 171a
Key: persona_pass — 171b
(171)

2nd Group: Johnson — 172c — 40:83:1D:00:00:02 — 172d
SSID: C841_FA52DA_B — 172a
Key: personb_pass — 172b
(172)

Cancel (174) | Set (173)

Apparatus Management/Billing Report

Target Year: 2019 — 175
Target Month: 07 — 176

| Host name | SSID / MAC Address | Color | Mono | Last Use Date |
|---|---|---|---|---|
| Smith | C841_FA52DA_GroupA<br>40:83:1D:00:00:01 | 321 | 557 | 2019/7/16 13:57 |
| Johnson | C841_FA52DA_GroupB<br>40:83:1D:00:00:02 | 231 | 842 | 2019/7/16 08:41 |

OK — 178

17B

IMAGE PROCESSING APPARATUS AND IMAGE PROCESSING METHOD WITH DESTINATION IDENTIFIER USED TO ESTABLISH WIRELESS COMMUNICATION

TECHNICAL FIELD

The present invention relates to an image processing apparatus and an image processing method.

BACKGROUND

Conventionally, an image processing apparatus, such as a printer, a scanner, a copying machine, a facsimile, or a multifunction machine that integrates functions of these apparatuses, that can receive a job from an external device such as a mobile terminal using a communication function such as Wi-Fi Direct (registered trademark) and can execute copying, printing and the like has been on the market. Such an image processing apparatus is disclosed, for example, in Patent Document 1 and the like.

RELATED ART

[Patent Doc. 1] JP Laid-Open Patent Application Publication 2014-89714

SUBJECT(S) TO BE SOLVED

However, for copying, printing and the like using an external device, it may be desirable to perform billing control. In this case, it was troublesome to perform an operation for billing control on an external device. It is desirable to provide an image processing apparatus and an image processing method that allow billing control to be easily performed without performing the operation for billing control.

SUMMARY

An image processing apparatus, disclosed in the application, includes a data processing part that processes image data: a storage part that stores billing information including a plurality of wireless communication identifiers and usage histories of the data processing part, each of the usage histories being associated with wireless communication identifiers, a communication part that establishes a wireless communication associated with one of the wireless communication identifiers such that the communication part wirelessly communicates with an external device, and a control part that, when receiving an image processing job from the external device through the communication part, determines one of the wireless communication identifiers that is used to establish the wireless communication wherein the one of the wireless communication identifiers is defined as a destination identifier, controls the data processing part based on the image processing job and updates one usage history that is associated with the destination identifier.

An image processing method, disclosed in the application, executed in an image processing apparatus that establishes a wireless communication with an external device, includes establishing a wireless communication using either a first identifier or a second identifier, which is different from the first identifier, that are wireless communication identifiers, storing billing information containing a first usage history associated with the first identifier and a second usage history associated with the second identifier, when receiving an image processing job, which contains an image data, with the first identifier, updating the first usage history based on the image data of the image processing job, when receiving an image processing job, which contains an image data, with the second identifier, updating the second usage history based on the image data of the image processing job.

According to the image processing apparatus and the image processing method as an embodiment of the present invention, billing control can be easily performed without installing a dedicated application.

BRIEF DESCRIPTION OF THE DRAWINGS

FIG. 4 illustrates an example of a billing management table.

FIG. 5 illustrates an example of a communication setting screen.

FIG. 9 illustrates a modified example of a billing setting table.

FIG. 10 illustrates a modified example of a billing management table.

FIG. 11 illustrates a modified example of a communication setting screen.

FIG. 12 illustrates a modified example of a screen that displays a billing report.

DETAILED DESCRIPTIONS OF THE PREFERRED EMBODIMENT(S)

In the following, embodiments of the present invention are described with reference to the diagrams. The following description is one specific example of the present invention and the present invention is not limited to the following modes. Further, the present invention is not limited to arrangements, dimensions, dimension ratios and the like of each configuration element illustrated in each diagram. The descriptions will be given in the following order:
1. First embodiment (image processing system having a printer)
2. Second embodiment (image processing system having a copying machine)

1. First Embodiment

Figure 1:
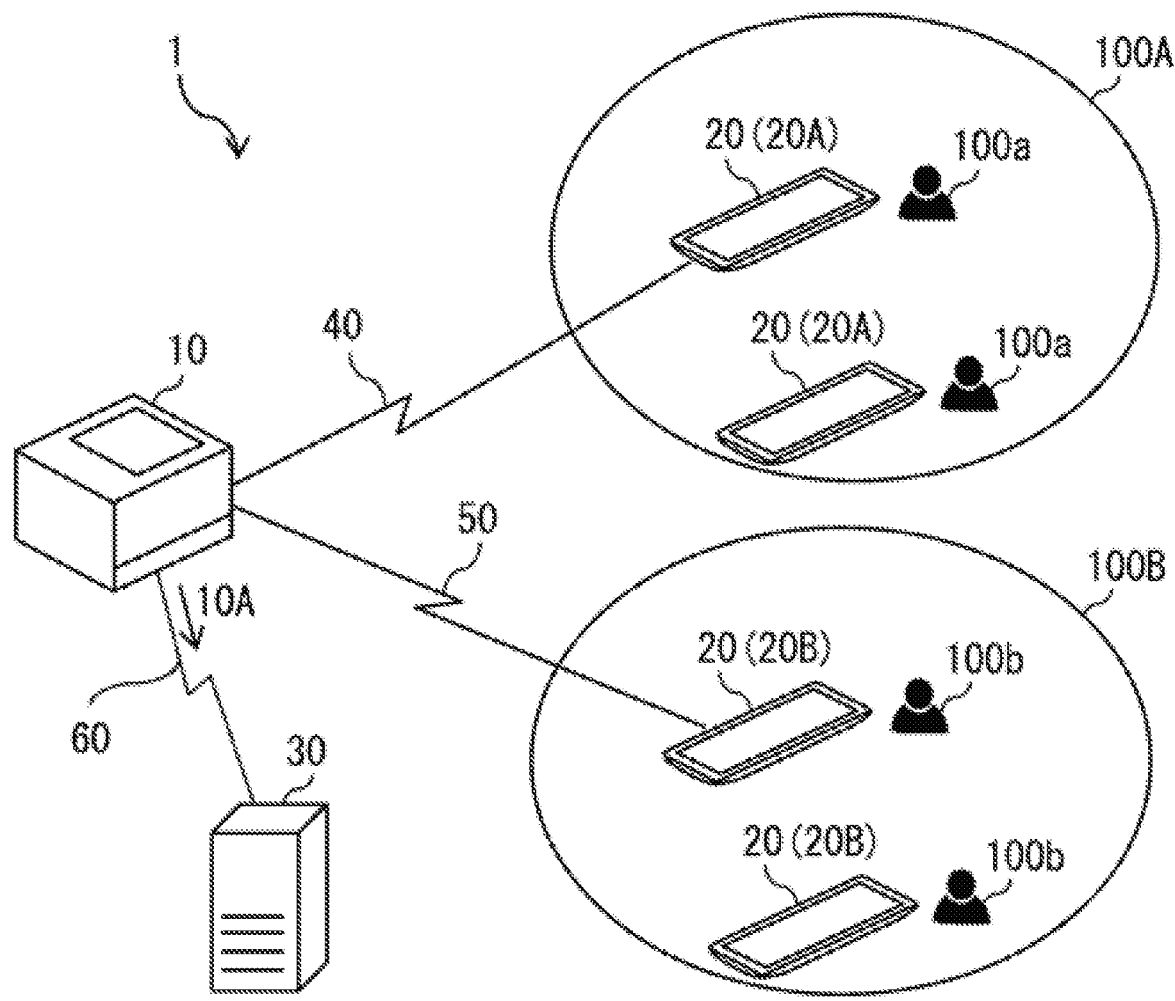
FIG. 1 illustrates a schematic configuration example of an image processing system having a printer according to the first embodiment of the present invention.

[Configuration]
FIG. 1 illustrates a schematic configuration example of an image processing system 1 having the printer 10 according to the first embodiment of the present invention. The image processing system 1 has the printer 10, multiple mobile terminals 20, and the server device 30. The printer 10 corresponds to a specific example of an "image processing apparatus" of the present invention. The mobile terminals 20 each correspond to a specific example of an "external device" of the present invention. The server device 30 corresponds to a specific example of an "external system" of the present invention.

The printer 10 and each of the mobile terminals 20 are connected to each other via the network 40 or the network 50. The printer 10 is a printing device compatible with Wi-Fi Direct. The mobile terminals 20 are each an information processing device compatible with Wi-Fi Direct, such as a Wi-Fi Direct compatible laptop, tablet terminal or smartphone. Wi-Fi Direct is one of the communication methods using a wireless LAN (Local Area Network), and refers to a function that wirelessly and directly connects Wi-Fi compatible devices to each other without involvement of a wireless LAN router (or an access point).

The network 40 is a network for connecting the printer 10 and a mobile terminal 20 (20A), used by a user 100a belonging to the first group 100A, to each other by Wi-Fi Direct. The network 50 is a network for connecting the printer 10 and a mobile terminal 20 (20B), used by a user 100b belonging to the second group 100B, to each other by Wi-Fi Direct. Here, the first group 100A and the second group 100B are different from each other with respect to the billing content of image processing on the printer 10. The first group 100A is, for example, a group in which the fee for image processing on the printer 10 is set to a low price range. On the other hand, the second group 100B is, for example, a group in which the fee for image processing on the printer 10 is set to a normal price range.

The printer 10 and the server device 30 are connected to each other via the network 60. The server device 30 performs billing process based on billing information 10A input from the printer 10 via the network 60. The network 60 is, for example, a network which performs communication with a communication protocol (TCP/IP) commonly used on the internet. The network 60 can be a network which performs communication with a communication protocol other than TCP/IP.

(Printer 10)

Figures 2, 3:
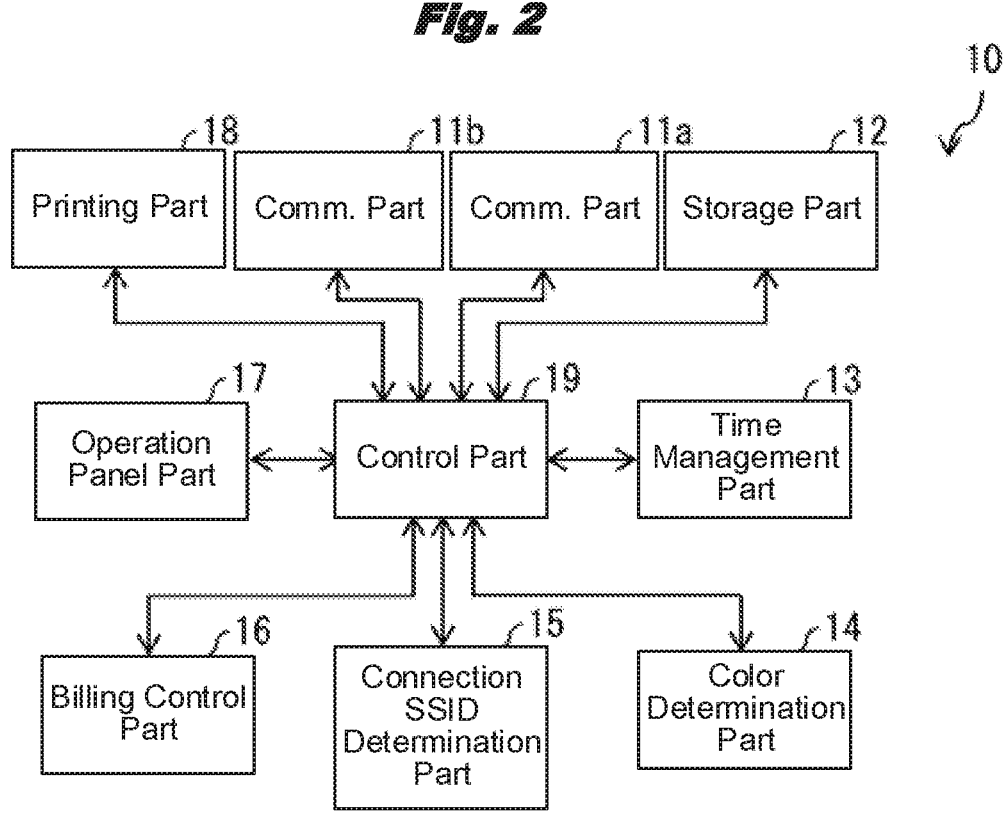
FIG. 2 illustrates an example of functional blocks of the printer.
FIG. 3 illustrates an example of a billing setting table.

FIG. 2 illustrates an example of functional blocks of the printer 10. The printer 10 performs printing process using the image data acquired from a mobile terminal 20 via the network 40 or the network 50. The printer 10 has, for example, the communication part 11a, the communication part 11b, the memory part 12, the time management part 13, the color determination part 14, the connection SSID determination part 15, the billing control part 16, the operation panel part 17, the printing part 18, and the control part 19. The communication part 11a corresponds to a specific example of a "communication part" of the present invention. The communication part 11b corresponds to a specific example of an "output part" of the present invention. The printing part 18 corresponds to a specific example of a "data processing part" of the present invention. The billing control part 16 and the control part 19 correspond to a specific example of a "control part" of the present invention.

The communication part 11a, the communication part 11b, the memory part 12, the time management part 13, the color determination part 14, the connection SSID determination part 15, the billing control part 16, the operation panel part 17, the printing part 18, and the control part 19 may be configured with, for example, a hardware (circuit). At least one of the communication part 11a, the communication part 11b, the memory part 12, the time management part 13, the color determination part 14, the connection SSID determination part 15, the billing control part 16, the operation panel part 17, the printing part 18, and the control part 19 may be configured with a software (program). In this case, a program for causing a computer to execute each function may be used, for example, by installing it in the above computer in advance, or may be used by installing it in the above computer from a network or a recording medium.

The communication part 11a is a communication interface that performs communication with one or multiple mobile terminals 20 by Wi-Fi Direct (that is, via the network 40 or the network 50). The communication part 11a performs communication by Wi-Fi Direct with a mobile terminal 20 with which communication associated with at least one of the multiple SSIDs (Service Set Identifiers) described in the billing setting table 12A (to be described later) has been established. The communication part 11b is, for example, a communication interface that performs communication with the server device 30 using a communication protocol (TCP/IP) commonly used on the internet. The communication part 11b outputs, for example, the billing information 10A to the server device 30.

When a connection request with respect to an SSID is received from a mobile terminal 20, the communication part 11a extracts the SSID and the key (password) included in the received connection request, then performs authentication based on the extracted SSID and key (password). The SSID corresponds to a specific example of a "wireless communication identifier" of the present invention. The communication part 11a performs authentication, for example, by collating the extracted SSID and key (password) with authentication information stored in the memory part 12. As a result, in the event the authentication is successful, the communication part 11a transmits a connection permission as a response to the output connection request to the mobile terminal 20 which made the connection request. In this way, by transmitting the connection permission to the mobile terminal 20, Wi-Fi Direct communication between the communication part 11a and the mobile terminal 20, which is the transmission destination of the connection permission, is established. When an image processing job is acquired from a mobile terminal 20 with which communication has been established, the communication part 11a outputs the acquired image processing job to the control part 19. In the present embodiment, an image processing job is a print job which includes image data and an SSID. When a print job is received from a mobile terminal 20 with which communication has been established, the communication part 11a outputs the received print job to the control part 19.

The memory part 12 is configured by, for example, a volatile memory such as a DRAM (Dynamic Random Access Memory), or a nonvolatile memory such as an EEPROM (Electrically Erasable Programmable Read-Only Memory) or a flash memory. The memory part 12 stores the billing setting table 12A and the billing management table 12B as the billing information 10A.

In the billing setting table 12A, for example, as illustrated in FIG. 3, multiple billing groups, multiple SSIDs, and multiple time information (Last Use Date) are set. In the billing setting table 12A, a SSID and time information (Last Use Date) are set for each billing group. In the present embodiment, the time information (Last Use Date) is, for example, the time when the last image processing was performed on the printing part 18.

In the billing setting table 12A, the multiple SSIDs include, for example, 2 SSIDs. In this case, one SSID is a SSID which is assigned to the first group 100A (or each mobile terminal 20A belonging to the first group 100A). In the following, this SSID will be called SSID1, for convenience. SSID1's character string is, for example, as illustrated in FIG. 3, C841_FA52DA_A. The other SSID is a SSID which is assigned to the second group 100B (or each mobile terminal 20B belonging to the second group 100B). In the following, this SSID will be called SSID2, for convenience. SSID2's character sting is, for example, as illustrated in FIG. 3, C841_FA52DA_B. "SSID1" and "C841_FA52DA_A" correspond to a specific example of a "first identification name (or first identifier)" of the present invention. "SSID2" and "C841_FA52DA_B" correspond to a specific example of a "second identification name (or second identifier)" of the present invention.

In the billing setting table 12A, the multiple time information (Last Use Date) includes, for example, the time information (Last Use Date) assigned to SSID1 and time information (Last Use Date) assigned to SSID2. The time information (Last Use Date) assigned to SSID1 is, for example, as illustrated in FIG. 3, 2019 Jul. 16 13:57. The time information (Last Use Date) assigned to SSID2 is, for example, as illustrated in FIG. 3, 2019 Jul. 16 08:41.

In the billing management table 12B, for example, as illustrated in FIG. 4, the usage history 121 associated with multiple billing groups (or multiple SSIDs) is set. In the present embodiment, the usage history 121 is set for each billing group (or SSID). The usage history 121 includes, for example, the usage history 121*a* associated with the first group 100A (or SSID1), and the usage history 121*b* associated with the second group 100B (or SSID2). That is, the memory part 12 stores the usage history 121*a* corresponding to the first group 100A (or SSID1) as well as the usage history 121*b* corresponding to the second group 100B (or SSID2). The usage history 121 corresponds to a specific example of a "usage history" of the present invention. The usage history 121*a* corresponds to a specific example of a "first usage history" of the present invention. The usage history 121*b* corresponds to a specific example of a "second usage history" of the present invention.

In the present embodiment, the usage history 121 includes, for example, the color page output number and the monochrome page output number for each specified period (Date), as well as the color page output number and the monochrome page output number for each billing group (or SSID). Further, the usage history 121 may include the page output number by each sheet size or the page output number and the like by each printing quality (high resolution, medium resolution, or low resolution).

In the billing management table 12B, the usage history 121*a* includes information like, for example, as illustrated in FIG. 4, 271 pages of color page output and 221 pages of monochrome page output on 2019 March, 525 pages of color page output and 331 pages of monochrome page output on 2019 April, 732 pages of color page output and 375 pages of monochrome page output on 2019/5, 243 pages of color page output and 612 pages of monochrome page output on 2019 June, 321 pages of color page output and 557 pages of monochrome page output on 2019 July. In the billing management table 12B, the usage history 121*b* includes information like, for example, as illustrated in FIG. 4, 0 pages of color page output and 0 pages of monochrome page output on 2019 March, 231 pages of color page output and 1432 pages of monochrome page output on 2019 April, 123 pages of color page output and 412 pages of monochrome page output on 2019 May, 721 pages of color page output and 215 pages of monochrome page output on 2019 June, 231 pages of color page output and 842 pages of monochrome page output on 2019 July.

The time management part 13 manages time on the printer 10. When an image processing job is input from the control part 19, the time management part 13 outputs, for example, the time when the image processing job was input (that is, the time image processing was performed on the printing part 18) to the control part 19. The color determination part 14 performs color/monochrome determination based on the image data included in the print job. When a data for printing (print image) generated from the image data included in the print job is input from the control part 19, the color determination part 14 determines, for example, whether each page is a color page or not in the input print image, then outputs determination result to the control part 19. The color determination part 14 outputs, for example, the number of color pages (color page output number) and the number of monochrome pages (monochrome page output number) included in the input print image to the control part 19 as the determination result. The connection SSID determination part 15 analyzes the image processing job input from the mobile terminals 20. When an image processing job is input from the control part 19, the connection SSID determination part 15 extracts the SSID included in the image processing job, then outputs the extracted SSID to the control part 19. When a print job is input from the control part 19, the connection SSID determination part 15 extracts, for example, the SSID included in the print job, then outputs the extracted SSID to the control part 19.

The billing control part 16 updates the usage history 121 based on the image data included in the print job. When a print job is received with SSID1, the billing control part 16 updates the usage history 121*a* associated with SSID1 used to establish the communication based on the image data included in the print job. When a print job is received with SSID2, the billing control part 16, updates the usage history 121*b* associated with SSID2 used to establish the communication based on the image data included in the print job. The billing control part 16 updates the usage history 121 based on the determination result of the color determination part 14, the time generated by the time management part 13, and the SSID determined by the connection SSID determination part 15. Putting it other way, these usage histories are updated based on work amounts of the printer. The work amounts of the present invention may be counted by several aspects, for example, number of sheets (pages) of printings, power consumptions, use duration (how many minutes/hours are used for the printing), toner/ink consumption etc.

It is assumed that the SSID determined by the connection SSID determination part 15 is SSID1. Further, it is assumed that the time output from the time management part 13 is 2019 Jul. 21 13:42. In this case, the billing control part 16 stores, for example, the value of the color page output number included in the determination result of the color determination part 14 added to the color page output number (321 pages) corresponding to 2019 July including the time (2019 Jul. 21 13:42) within the usage history 121*a* of SSID1 as the color page output number corresponding to 2019 July including the time (2019 Jul. 21 13:42) within the usage history 121*a* of SSID1 to the memory part 12 (the usage history 121). Further, the billing control part 16 stores, for example, the value of the monochrome page output number included in the determination result of the color determination part 14 added to the monochrome page output number (557 pages) corresponding to 2019 July including the time (2019 Jul. 21 13:42) within the usage history 121a of SSID1 as the monochrome page output number corresponding to 2019 July including the time (2019 Jul. 21 13:42) within the usage history 121a of SSID1 to the memory part 12 (the usage history 121).

The operation panel part 17 is configured, for example, to include a touch panel, and displays an interface based on the screen data input from the control part 19 on the screen of the touch panel. Based on the screen data input from the control part 19, the operation panel part 17 displays, for example, an interface for causing a user to set multiple SSIDs and keys (passwords) which are associated with the multiple SSIDs. Based on the screen data input from the control part 19, the operation panel part 17 displays, for example, an interface for causing a user to execute communication setting for each SSID. That is, the control part 19 and the operation panel part 17 provide, for each SSID, an interface for causing a user to set multiple SSIDs and functions related to the image processing associated with the multiple SSIDs.

Based on the screen data input from the control part 19, the operation panel part 17 displays, for example, the screen 17A (interface) as illustrated in FIG. 5. The screen 17A is a communication setting screen, and on the screen 17A an interface 171 is provided for SSID1 and an interface 172 is provided for SSID2. Further, in the screen 17A, a button for setting the input content (the set button 173) and a button for canceling the input content (the cancel button 174) are provided.

In the interface 171, for example, the window 171a to input the character string of SSID1 and a window 171b to input the key (password) corresponding to SSID1 are provided. FIG. 5 illustrates a state in which a character string of SSID1 is input in the window 171a, and a key (password) corresponding to SSID1 is input in the window 171b. Similarly, in the interface 172, for example, the window 172a to input a character string of SSID2 and the window 172b to input the key (password) corresponding to SSID2 are provided. FIG. 5 illustrates a state in which the character string of SSID2 is input in the window 172a, and the key (password) corresponding to SSID2 is input in the window 172b.

When the set button 173 is selected by a user, the operation panel part 17 outputs the multiple SSIDs input in the window 171a and the window 172a and the multiple keys (passwords) input in the window 171b and the window 172b to the control part 19.

Based on the print job acquired from a mobile terminal 20 via the communication part 11, the printing part 18 generates the print image. When a print job is input from the control part 19, the printing part 18 performs printing process using the image data included in the print job input from the control part 19. The printing part 18 generates the print image from the image data included in the print job, then performs printing process using the generated print image.

The control part 19 causes a user to set multiple SSIDs and keys (passwords) associated with the multiple SSIDs, then stores the content set by the user in the memory part 12 as the communication setting information. The control part 19 generates, for example, a screen data for causing a user to set multiple SSIDS and keys (passwords) associated with the multiple SSIDs, then outputs the screen data to the operation panel part 17. The control part 19 generates, for example, a screen data for causing a user to set a SSID and a key (password) associated with the SSID for each SSID, then outputs the screen data to the operation panel part 17. As a response to the output of the screen data to the operation panel part 17, the control part 19 acquires the content input to the operation panel part 17 as the communication setting information. The control part 19 stores the acquired communication setting information in the memory part 12. In this case, the control part 19 stores the multiple SSIDs included in the communication setting information (for example, C841_FA52DA_A, C841_FA52DA_B) in the billing setting table 12A or the billing management table 12B.

The control part 19 acquires an image processing job from a mobile terminal 20 with which communication has been established, via the communication part 11a. The control part 19 acquires, for example, a print job from a mobile terminal 20 with which communication has been established, via the communication part 11a.

The control part 19 outputs the received image processing job to the time management part 13. As a response to the image processing job output to the time management part 13, the control part 19 acquires the time information. This time information is equivalent to the time when the image processing job was input to the time management part 13, and corresponds to the time the image processing was performed on the printing part 18.

The control part 19 outputs the received image processing job to the connection SSID determination part 15. As a response to the image processing job output to the connection SSID determination part 15, the control part 19 acquires the SSID included in the image processing job from the connection SSID determination part 15. When an image processing job is a print job including an image data, the control part 19 outputs the received print job to the connection SSID determination part 15. As a response to the print job output to the connection SSID determination part 15, the control part 19 acquires the SSID included in the print job from the connection SSID determination part 15.

When an image processing job is acquired via the communication part 11a from a mobile terminal 20 with which communication has been established, the control part 19 controls the printing part 18 based on the acquired image processing job. When an image processing job is acquired via the communication part 11a from a mobile terminal 20 with which communication has been established, the control part 19 outputs the acquired image processing job to the printing part 18. In the event a print job including an image data is acquired from a mobile terminal 20 via the communication part 11a as an image processing job, the control part 19 outputs, for example, the print job (image data) to the printing part 18. As a response to the print job output to the printing part 18, the control part 19 acquires the data for printing (print image) generated from the image data included in the print job from the printing part 18. The control part 19 outputs the acquired print image to the color determination part 14. As a response to the print image output to the color determination part 14, the control part 19 acquires the determination result from the color determination part 14. The determination result includes, for example, information about the number of color pages (color page output number) and the number of monochrome pages (monochrome page output number) included in the input print image.

The control part 19 outputs the determination result of the color determination part 14, the time generated by the time management part 13, and the SSID determined by the connection SSID determination part 15 to the billing control part 16. As a response to the output to the billing control part 16, the control part 19 acquires an update completion notice of the usage history 121. The control part 19 completes the sequence of printing process when it acquires the update completion notice of the usage history 121 from the billing control part 16.

[Operation]

Next, an example of a communication setting on the printer 10 is described.

First, a user calls a communication setting screen via the operation panel part 17. Then, the control part 19 generates, for example, the screen data for causing a user to set multiple SSIDs and keys (passwords) associated with the multiple SSIDs, then outputs the screen data to the operation panel part 17. Based on the screen data input from the control part 19, the operation panel part 17 displays, for example, the screen 17A for causing a user to set multiple SSIDs and functions related to the image processing associated with the multiple SSIDs.

The user inputs, for example, the character string of SSID1 (C841_FA52DA_A) to the window 171a, and the key (password) corresponding to SSID1 to the window 171b. Further, the user inputs, for example, the character string of SSID2 (C841_FA52DA_B) to the window 172a, and the key (password) corresponding to SSID2 to the window 172b. After that, when the user selects the set button 173, the operation panel part 17 outputs the multiple SSIDs input in the window 171a and the window 172a as well as the multiple keys (passwords) input in the window 171b and the window 172b to the control part 19. The control part 19 acquires the content input from the operation panel part 17 as the communication setting information, then stores the acquired communication setting information in the memory part 12. In this case, the control part 19 stores the multiple SSIDs included in the communication setting information (for example, C841_FA52DA_A, C841_FA52DA_B) to the billing setting table 12A or the billing management table 12B. In this way, the communication setting is performed on the printer 10.

Next, an example of a printing process on the printer 10 is described.

Figure 6:
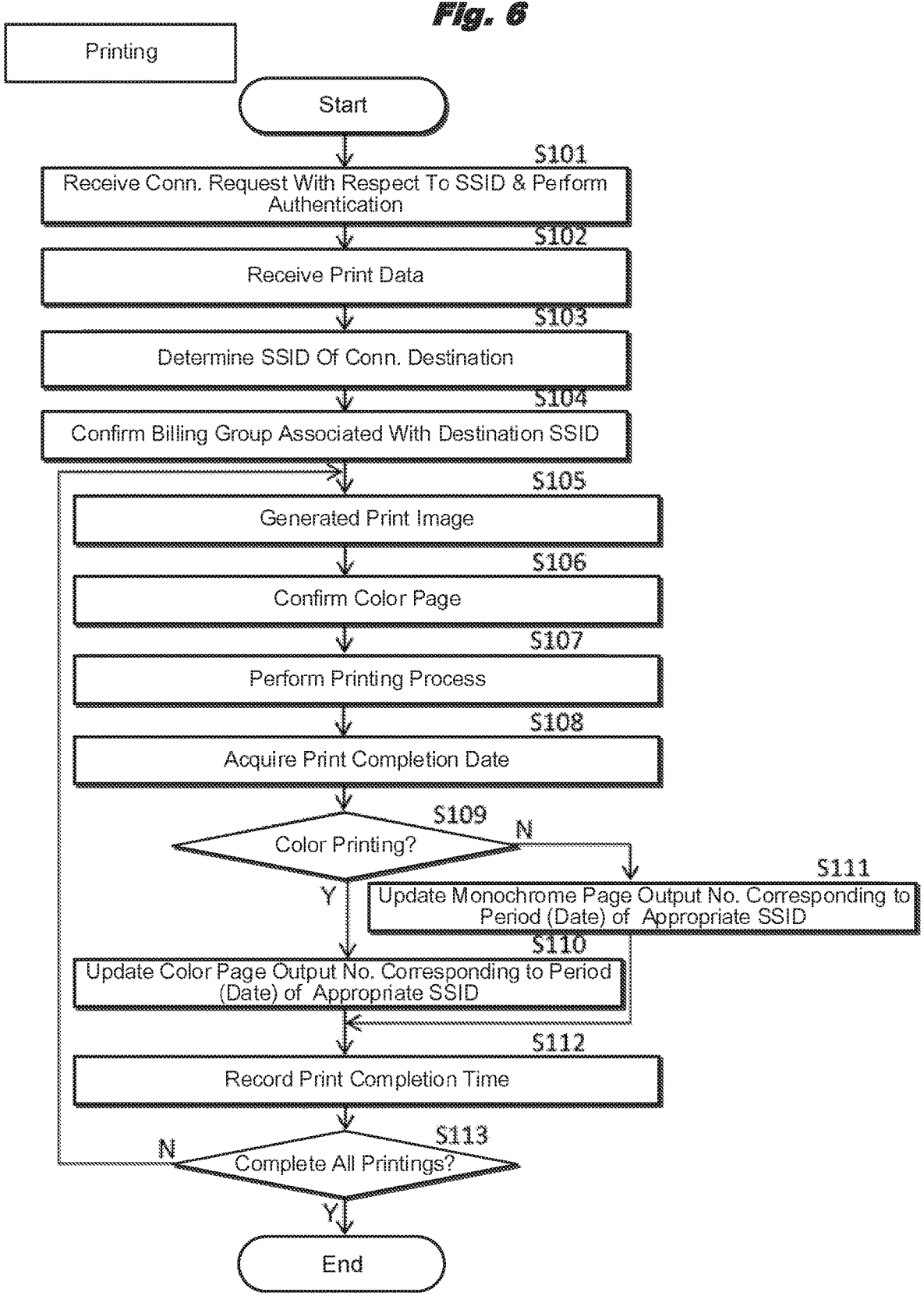
FIG. 6 illustrates an example of a printing process.

FIG. 6 illustrates an example of a printing process on the printer 10. First, a user 100a opens a Wi-Fi setting screen on a mobile terminal 20A and turns on the Wi-Fi. Next, the user 100a selects SSID1 (C841_FA52DA_A) of the printer 10 from a list on the mobile terminal 20A, inputs the key (password) for SSID, then presses the "Transmit button." Then, the mobile terminal 20A transmits the connection request including SSID1 and the key (password) (that is, the "connection request with respect to SSID1") to the printer 10 via the network 40.

The printer 10 (the communication part 11a) receives the connection request with respect to SSID1 from the mobile terminal 20A and performs authentication (S101). When the connection request with respect to SSID1 is received from the mobile terminal 20A, the printer 10 (the communication part 11a) extracts, for example, the SSID and the key (password) included in the received connection request, then performs authentication based on the extracted SSID and key (password). As a result, in the event the authentication is successful, the communication part 11a may transmit a connection permission as a response to the output connection request to the mobile terminal 20A that made the connection request. In this case, it is also possible that the operation panel part 17 asks the user for a connection permission, and when the user inputs a connection permission, the communication part 11a transmits the connection permission as a response to the output connection request to the mobile terminal 20A which made the connection request. In this way, by transmitting the connection permission to the mobile terminal 20A, Wi-Fi Direct communication between the communication part 11a and the mobile terminal 20A, which is the transmission destination of the connection permission, is established.

When the mobile terminal 20A receives the above-described connection permission and establishes Wi-Fi Direct communication with the printer 10 (the communication part 11a), the user 100a transmits the print data to the printer 10 (the communication part 11a). After the Wi-Fi Direct communication is established, the user 100a launches, for example, an application for print data transmission, and uses the launched application to transmit the print job including the print data and SSID1 to the printer 10 (the communication part 11a).

The printer 10 (the communication part 11a) receives the print job including the print data via Wi-Fi Direct (that is, via the network 40) (S102). The connection SSID determination part 15 analyzes the print job input from the mobile terminal 20A with which communication has been established. Based on the print job, the connection SSID determination part 15 determines an SSID of a connection destination (S103). The connection SSID determination part 15 determines, for example, the SSID of the connection destination by extracting SSID1 included in the print job. The connection SSID determination part 15 outputs, for example, the extracted SSID1 to the control part 19.

The control part 19 confirms the billing group associated with SSID1 input from the connection SSID determination part 15 (S104). For example, when an SSID1 is input from the connection SSID determination part 15, the connection SSID determination part 15 reads, for example, the usage history 121a corresponding to the input SSID1 from the billing management table 12B of the memory part 12. With these processes, the printer 10 turns from a job close status to a job open status in which the printer is able to receive a job input from the mobile terminal 20 or a job created by an operation of the user.

The control part 19 outputs the print job acquired from the mobile terminal 20 via the communication part 11a to the printing part 18. Based on the print job input from the control part 19, the printing part 18 generates the print image (S105). The printing part 18 outputs the generated print image to the control part 19. The control part 19 outputs the print image acquired from the printing part 18 to the color determination part 14. The color determination part 14 confirms the color page based on the print image input from the control part 19 (S106). The color determination part 14 determines, for example, whether each page is a color page or not in the print image, then outputs the determination result to the control part 19. The color determination part 14 outputs, for example, the number of color pages (color page output number) and the number of monochrome pages (monochrome page output number) included in the input print image to the control part 19 as the determination result. The control part 19 acquires the determination result from the color determination part 14.

The printing part 18 performs printing process using the generated print image (S107). The printing part 18 prints, for example, the toner image generated based on the print image on to a sheet and the like. In this way, printing is performed on the printer 10.

The control part 19 outputs the image processing job to the time management part 13. When an image processing job is input from the control part 19, the time management part 13 outputs the time the image processing job was input (that is, the time the image processing was performed on the printing part 18) to the control part 19. The control part 19 acquires the time input from the time management part 13 as the print completion date (S108).

The control part 19 outputs the determination result of the color determination part 14, the time generated by the time management part 13, and the SSID determined by the connection determination part 15, to the billing control part 16. The billing control part 16 updates the usage history 121 based on various information input from the control part 19 (the determination result of the color determination part 14, the time generated by the time management part 13, and the SSID determined by the connection SSID determination part 15). When a print on the printing part 18 includes color printing (S109; Y), the billing control part 16 updates the color page output number by adding the color page output number included in the determination result to the color page output number corresponding to the period (Date) including the time generated by the time management part 13, within the appropriate SSID usage history (S110). When a print on the printing part 18 includes monochrome printing (S109; N), the billing control part 16 updates the monochrome page output number by adding the monochrome page output number included in the determination result to the monochrome page output number corresponding to the period (Date) including the time generated by the time management part 13, within the appropriate SSID usage history (S111).

The control part 19 records the time generated by the time management part 13 on the billing setting table 12A of the memory part 12 (S112). In the event the control part 19 acquires multiple print data, it will sequentially execute S105-S112 until all printing is complete (S113; N). The control part 19 completes the sequence of printing process when all printing is complete (S113; Y).

The control part 19 outputs the updated billing information 10A at a specified time (for example, a determined date and time each month) to the communication part 11b. The communication part 11b outputs the billing information 10A input from the control part 19 to the server device 30 via the network 60.

Figures 7, 8:
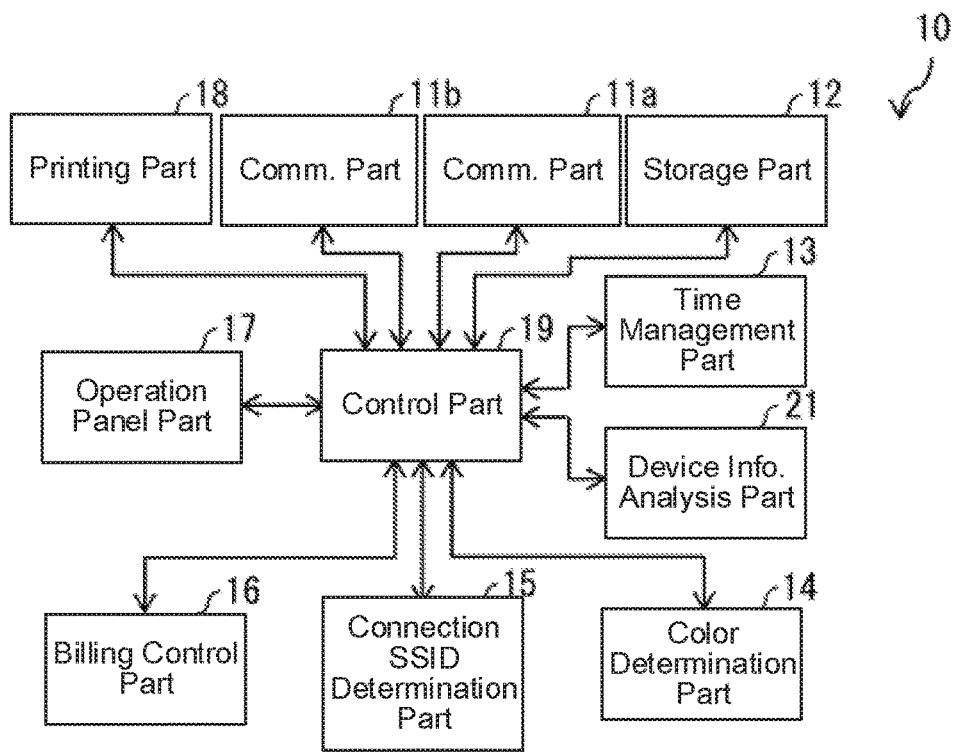
FIG. 7 illustrates an example of a screen that displays a billing report.
FIG. 8 illustrates a modified example of functional blocks of the printer in FIG. 2.

In this case, based on the updated billing information 10A, the control part 19 generates the screen data for displaying the billing report, then outputs the screen data to the operation panel part 17. Based on the screen data input from the control part 19, the operation panel part 17 displays, for example, the screen 17B (interface) as illustrated in FIG. 7.

In the screen 17B, the box 175 to select a target year of the billing report and the box 176 to select a target month of the billing report are provided. Further, in the screen 17B, multiple billing groups, SSID for each billing group, the color page output number and the monochrome page output number for the appropriate year and month selected in the box 175 and 176, and the time when the last image processing was performed on the printing part 18 (Last Use Date), which are included in the billing information 10A, are provided in a table format. Further, in the screen 17B, a button to close the screen 17B (OK button 178) is provided.

[Effects]

Next, an effect of the printer 10 is described.

Conventionally, an image processing apparatus, such as a printer, a scanner, a copying machine, a facsimile, or a multifunction machine that integrates functions of these apparatuses, that can receive a job from an external device such as a mobile terminal using a communication function such as Wi-Fi Direct and can execute copying, printing, scanning or the like has been on the market. However, for printing using an external device, it may be desirable to perform billing control. In this case, it was necessary to install a dedicated application to perform billing control on the external device, and this was troublesome.

On the other hand, in the present embodiment, multiple SSIDs and the usage history 121 associated with the multiple SSIDs are stored in the memory part 12 as the billing information 10A, and when a print job is acquired from a mobile terminal 20 after communication has been established, the printing part 18 is controlled based on the print job and the usage history 121 associated with the SSID used to establish communication is updated. As such, the usage history 121 can be updated in correspondence with the printing part 18 based on the print job. As a result, by having the billing information 10A including the updated usage history 121 output to the server device 30, billing process can be performed on the server device 30. Therefore, billing control related to an image processing job (for example, a print job) can be easily performed without installing a dedicated application for performing billing control related to the image processing job (for example, a print job) on a mobile terminal 20.

Further, in the present embodiment, in the event a print job including an image data is acquired via the communication part 11a as the image processing job, the image data is output to the printing part 18, printing process using the image data is performed on the printing part 18, then the usage history 121 is updated based on the image data. As such, the usage history 121 can be updated in correspondence with the control of the printing part 18 based on the print job. As a result, by having the billing information 10A including the updated usage history 121 output to the server device 30, billing process can be performed on the server device 30. Therefore, billing control related to an image processing job (for example, a print job) can be easily performed without installing a dedicated application for performing billing control related to the image processing job (for example, a print job) on a mobile terminal 20.

In the above embodiment, the printer 10 may perform billing control for each device (mobile terminal 20). In this case, the printer 10 further has, for example, as illustrated in FIG. 8, a device information analysis part 21.

The device information analysis part 21 identifies, for example, a mobile terminal 20 using the MAC address which is the identifier of the mobile terminal 20. In this modified example, when the image processing job is a print job including an image data, a MAC address, and a SSID, the device information analysis part 21 will extract, for example, the MAC address included in the image processing job when an image processing job is input from the control part 19, then outputs the extracted MAC address to the control part 19.

In this modified example, the memory part 12 stores, for example, a billing setting table 12A as illustrated in FIG. 9 and a billing management table 12B as illustrated in FIG. 10 as the billing information 10A.

In this modified example, in the billing setting table 12A, for example, as illustrated in FIG. 9, multiple billing devices, multiple host names, multiple MAC addresses, multiple SSIDs, and multiple time information (Last Use Date) are set. In the billing setting table 12A, a host name, a MAC address, a SSID, and a time information (Last Use Date) is set for each billing device.

In this modified example, in the billing setting table 12B, for example, as illustrated in FIG. 10, the usage history 121 associated with multiple billing devices (or multiple SSIDs) are set. In this modified example, the usage history 121 is set for each billing device (or SSID). The usage history 121 includes, for example, the usage history 121a associated with the first device (or SSID1), and the usage history 121b associated with the second device (or SSID2). That is, the memory part 12 stores the usage history 121a corresponding to the first device (or SSID1), as well as the usage history 121b corresponding to the second device (or SSID2).

In this modified example, based on the image data input from the control part 19, the operation panel part 17 displays, for example, the screen 17A (interface) as illustrated in FIG. 11. The screen 17A is a communication setting screen, and in the screen 17A, the interface 171 is provided for SSID1, and the interface 172 is provided for SSID2. Further, in the screen 17A, a button for setting the input content (the set button 173) and a button for canceling the input content (the cancel button 174) are provided.

In the interface 171, for example, the window 171a to input the character string of SSID1, the window 171b to input the key (password) corresponding to SSID1, the window 171c to input the character string of the Host name, and the window 171d to input the MAC address are provided. FIG. 11 illustrates a state in which the character string of SSID1 is input in the window 171a, the key (password) corresponding to SSID1 is input in the window 171b, Smith as the Host name is input in the window 171c, and 40:83:1D:00:00:01 as the MAC address is input in the window 171d. Similarly, in the interface 172, for example, the window 172a to input the character string of SSID2, the window 172b to input the key (password) corresponding to SSID2, the window 172c to input the character string of the Host name, and the window 172d to input the MAC address are provided. FIG. 11 illustrates a state in which the character string of SSID2 is input in the window 172a, the key (password) corresponding to SSID2 is input in the window 172b, Johnson as the Host name is input in the window 172c, and 40:83:1D:00:00:02 as the MAC address is input in the window 172d.

When the set button 173 is selected by the user, the operation panel part 17 outputs the multiple SSIDs input to the window 171a and the window 172a, the multiple keys (passwords) input to the window 171b and 172b, the multiple Host names input to the window 171c and the window 172c, and the multiple MAC addresses input to the window 171d and window 172d, to the control part 19.

The control part 19 causes a user to set multiple SSIDs, keys (passwords) associated with the multiple SSIDs, multiple Host names, and multiple MAC addresses, then stores the content set by the user in the memory part 12 as the communication setting information. The control part 19 generates, for example, screen data for causing a user to set multiple SSIDS, keys (passwords) associated with the multiple SSIDs, multiple Host names, and multiple MAC addresses, then outputs the screen data to the operation panel part 17. The control part 19 generates, for example, a screen data for causing a user to set a SSID, a key (password) corresponding to the SSID, a Host name, and a MAC address, for each SSID, then outputs the screen data to the operation panel part 17. As a response to the output of the screen data to the operation panel part 17, the control part 19 acquires the content input to the operation panel 17 as the communication setting information. The control part 19 stores the acquired communication setting information in the memory part 12. In this case, the control part 19 stores the multiple SSIDs included in the communication setting information (for example, C841_FA52DA_A, C841_FA52DA_B), the multiple MAC addresses (for example, 40:83:1D:00:00:01, 40:83:1D:00:00:02), and the multiple Host names (for example, Smith, Johnson) to the billing setting table 12A. Further, the control part 19 stores the multiple SSIDS included in the communication setting information (for example, C841_FA52DA_A, C841_FA52DA_B) to the billing management table 12B.

Based on the updated billing information 10A, the control part 19 generates screen data for displaying the billing report, then outputs the screen data to the operation panel part 17. Based on the screen data input from the control part 19, the operation panel part 17 displays, for example, the screen 17B (interface) as illustrated in FIG. 12.

In the screen 17B, the box 175 to select a target year of the billing report and the box 176 to select a target month of the billing report are provided. Further, in the screen 17B, host names of the multiple billing devices, SSIDs and MAC addresses for each host name, the color page output number and the monochrome page output number for the appropriate year and month selected in the box 175 and 176, and the time when the last image processing was performed on the printing part 18 (Last Use Date), which are included in the billing information 10A, are provided in a table format. Further, in the screen 17B, a button to close the screen 17B (the OK button 178) is provided.

In this way, in this modified example, billing control is performed for each device (a mobile terminal 20). Even under such circumstance, a similar effect as in the above embodiment can be achieved.

2. Second Embodiment

[Configuration]

Figure 13:
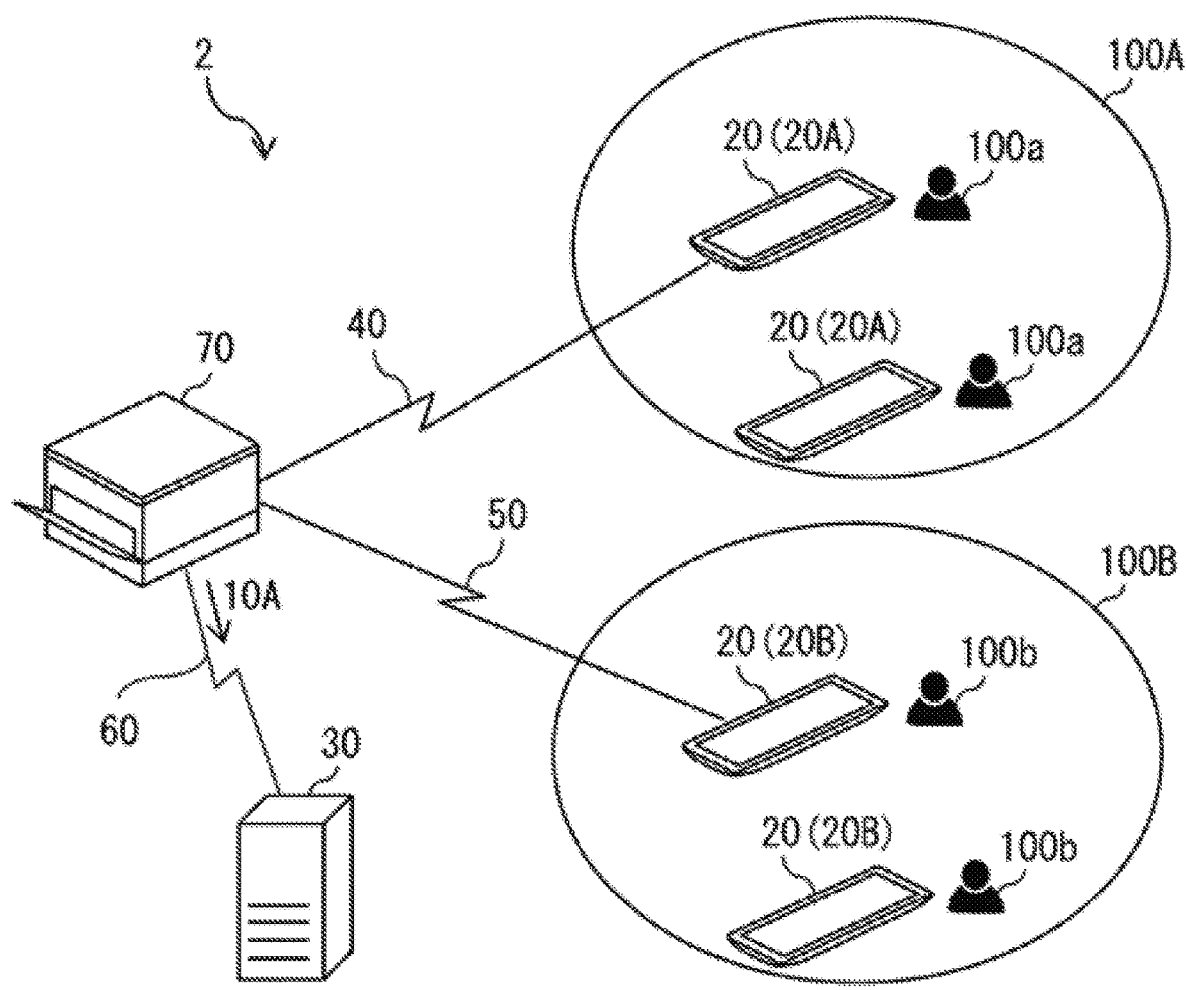
FIG. 13 illustrates a schematic configuration example of an image processing system having a copying machine according to the second embodiment of the present invention.

FIG. 13 illustrates a schematic configuration example of an image processing system 2 having a copying machine 70 according to the second embodiment of the present invention. The image processing system 2 has the copying machine 70, multiple mobile terminals 20, and the server device 30. The copying machine 70 corresponds to a specific example of an "image processing apparatus" of the present invention. The copying machine 70 and each of the mobile terminal 20 are connected to each other via the network 40 or the network 50. The copying machine 70 is a Wi-Fi Direct compatible printing device. The copying machine 70 and the server device 30 are connected to each other via the network 60.

The network 40 is a network for connecting the copying machine 70 and a mobile terminal 20 (20A) used by a user 100a belonging to the first group 100A to each other by Wi-Fi Direct. The network 50 is a network for connecting the copying machine 70 and a mobile terminal 20 (20B) used by a user 100b belonging to the second group 100B to each other by Wi-Fi Direct. Here, the first group 100A and the second group 100B are different from each other with respect to the billing content of image processing on the copying machine 70. The first group 100A is, for example, a group in which the fee for image processing on the copying machine 70 is set to a low price range. On the other hand, the second group 100B is, for example, a group in which the fee for image processing on the copying machine 70 is set to a normal price range.

(Copying Machine 70)

Figure 14:
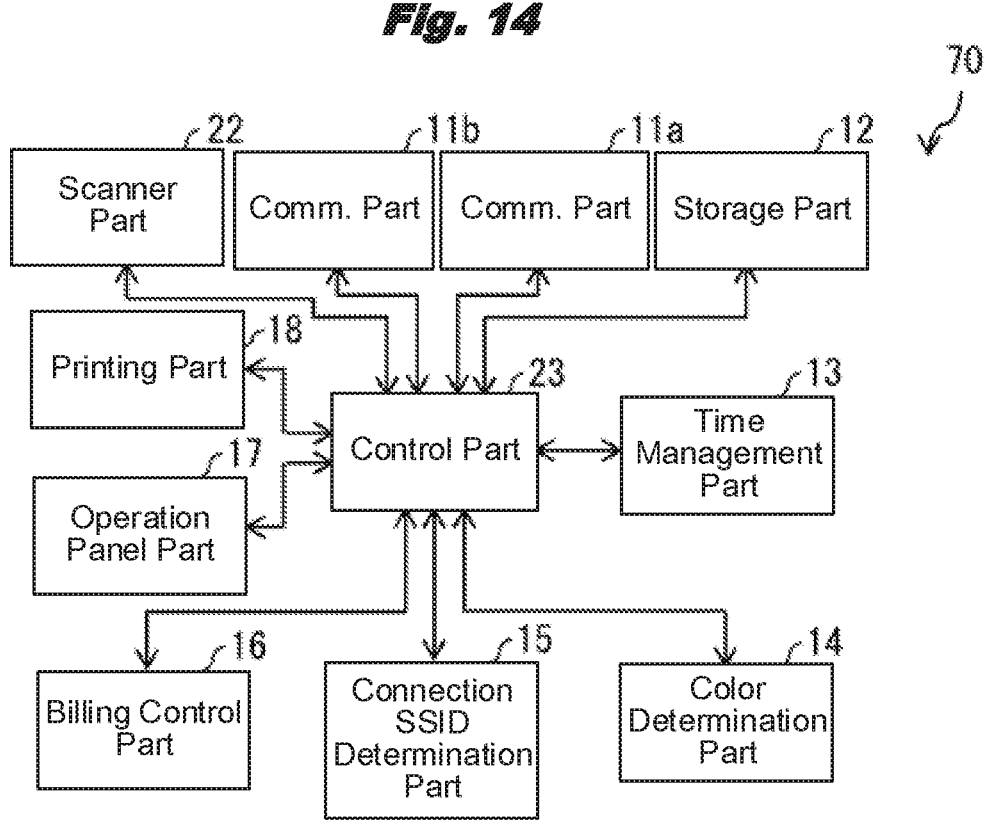
FIG. 14 illustrates an example of functional blocks of the copying machine.

FIG. 14 illustrates an example of functional blocks of the copying machine 70. The copying machine 70 performs printing process using the image data acquired from the scanner part 22. The copying machine 70 has, for example, the communication part 11a, the communication part 11b, the memory part 12, the time management part 13, the color determination part 14, the connection SSID determination part 15, the billing control part 16, the operation panel part 17, the printing part 18, the scanner part 22, and the control part 23. The scanner part 22 corresponds to a specific example of an "imaging part" of the present invention. The billing control part 16 and the control part 23 correspond to a specific example of a "control part" of the present invention. In the following, a configuration which is the same as in the above embodiment is denoted using the same reference numeral symbol as in the above embodiment. Also, in the following, description about a configuration which is the same as in the above embodiment shall be omitted as appropriate. Further, the control part 19 in the above embodiment shall be replaced with the control part 23.

The communication part 11a, the communication part 11b, the memory part 12, the time management part 13, the color determination part 14, the connection SSID determination part 15, the billing control part 16, the operation panel part 17, the printing part 18, the scanner part 22, and the control part 23 may be configured with, for example, a hardware (circuits). At least one of the communication part 11a, the communication part 11b, the memory part 12, the time management part 13, the color determination part 14, the connection SSID determination part 15, the billing control part 16, the operation panel part 17, the printing part 18, the scanner part 22, and the control part 23 may be configured with a software (program). In this case, a program for causing a computer to execute each function may be used, for example, by installing it in the above computer in advance, or may be used by installing it in the above computer from a network or a recording medium.

In the present embodiment, when an image processing job is acquired from a mobile terminal 20 with which communication has been established, the communication part 11a outputs the acquired image processing job to the control part 23. In the present embodiment, an image processing job is a copy job which includes a SSID. When a copy job is acquired from a mobile terminal 20 with which communication has been established, the communication part 11a outputs the acquired copy job to the control part 23.

In the present embodiment, the printing part 18 processes the image data input from the control part 23. The printing part 18 processes, for example, the image data obtained by the scanner part 22. The printing part 18 performs, for example, a printing process using the image data obtained by the scanner part 22. In the present embodiment, the printing part 18 generates the printing image based on the image data obtained by the scanner part 22.

The control part 23 acquires an image processing job from a mobile terminal 20 with which communication has been established, via the communication part 11. The control part 23 acquires, for example, a copy job from a mobile terminal 20 with which communication has been established, via the communication part 11.

When an image processing job is acquired via the communication part 11 from a mobile terminal 20 with which communication has been established, the control part 23 controls the printing part 18 based on the acquired image processing job. In the event an image processing job is acquired as the copy job from a mobile terminal 20 via the communication part 11, the control part 23 outputs, for example, the image data obtained by the scanner 22 to the printing part 18. As a response to the image data output to the printing part 18, the control part 23 acquires from the printing part 18 the data for printing (print image) generated from the image data. The control part 23 outputs the acquired print image to the color determination part 14. As a response to the print image output to the color determination part 14, the control part 23 acquires the determination result from the color determination part 14. The determination result includes, for example, information about the number of color pages (color page output number) and the number of monochrome pages (monochrome page output number) included in the input print image.

[Operation]

Next, an example of a copying process on the copying machine 70 is described.

Figure 15:
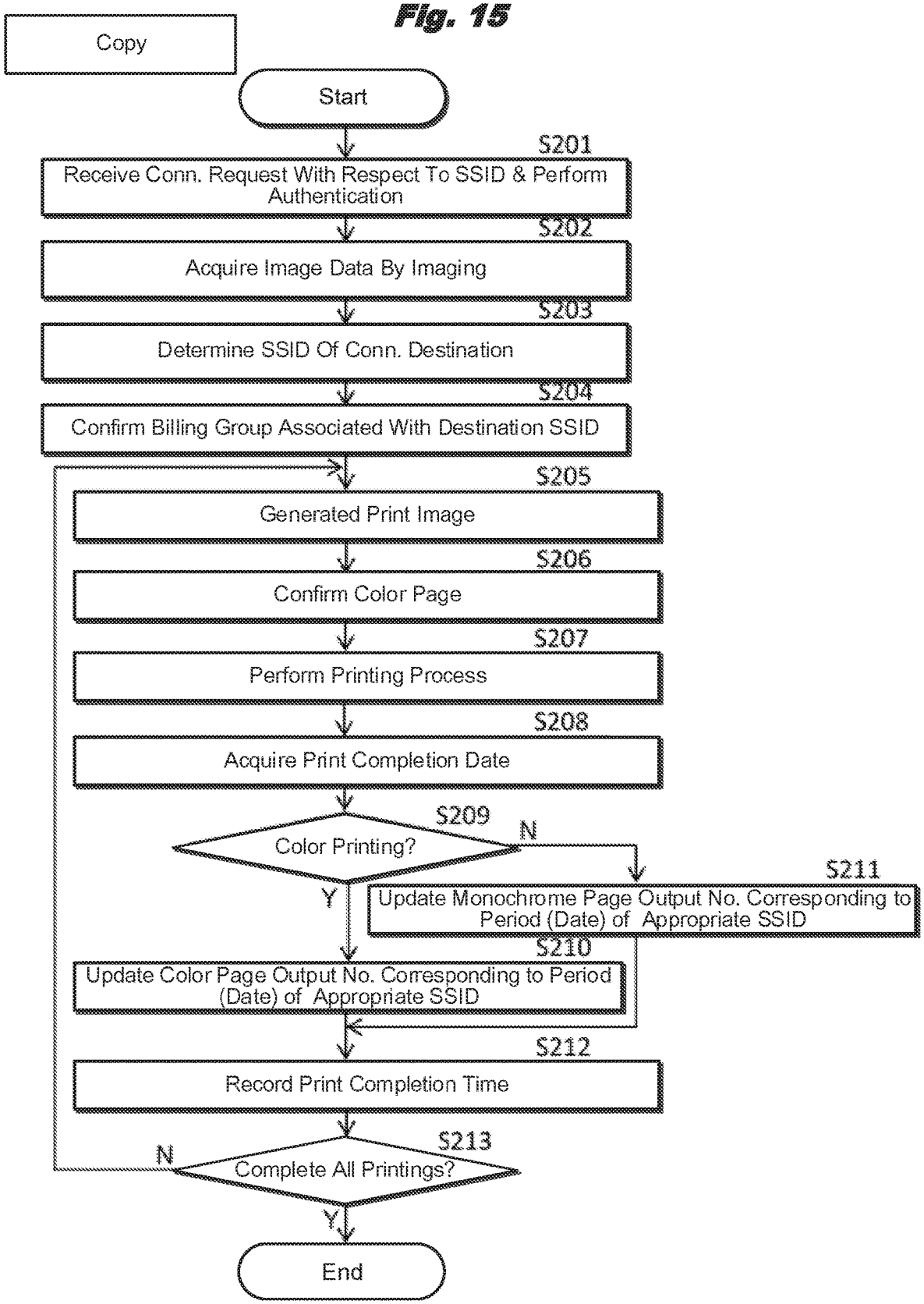
FIG. 15 illustrates an example of a copying process.

FIG. 15 illustrates an example of a copying process on the copying machine 70. First, a user 100a opens a Wi-Fi setting screen on a mobile terminal 20A and turns on the Wi-Fi. Next, the user 100a selects SSID1 (C841_FA52DA_A) of the copying machine 70 from a list on the mobile terminal 20A, inputs the key (password) of SSID1, then presses the "Transmit button." Then, the mobile terminal 20A transmits a connection request including SSID1 and the key (password) (that is, a "connection request with respect to SSID1") to the copying machine 70 via the network 40.

The copying machine 70 (the communication part 11a) receives the connection request with respect to SSID1 from a mobile terminal 20A and performs authentication (S201). When the connection request with respect to SSID1 is received from the mobile terminal 20A, the copying machine 70 (the communication part 11a) extracts, for example, the SSID and the key (password) included in the received connection request, and performs authentication based on the extracted SSID and key (password). As a result, in the event the authentication is successful, the communication part 11a may transmit a connection permission as a response to the output connection request to the mobile terminal 20 which made the connection request. In this case, it is also possible that the operation panel part 17 asks the user for a connection permission, and, when the user inputs the connection permission, the communication part 11a transmits the connection permission as a response to the output connection request to the mobile terminal 20 which made the connection request. In this way, by transmitting the connection permission to the mobile terminal 20, Wi-Fi Direct communication between the communication part 11a and the mobile terminal 20A which is the transmission destination of the connection permission is established.

When the mobile terminal 20A receives the above-described connection permission and establishes Wi-Fi Direct communication with the copying machine 70 (the communication part 11a), the user 100a acquires the image data with the scanner part 22 by imaging (S202). After Wi-Fi Direct communication is established, the user 100a places, for example, a predetermined sheet of paper on the scanner part 22, then scans the placed predetermined sheet of paper on the scanner part 22. As such, the scanner part 22 acquires the image data. The scanner part 22 outputs the acquired image data to the control part 23. After that, the user 100a launches an application for instructing the copy, and uses the launched application to transmit the copy job including SSID1 to the copying machine 70 (the communication part 11a).

The copying machine 70 (the communication part 11a) receives the copy job via Wi-Fi Direct (that is, via the network 40). The connection SSID determination part 15 analyzes the copy job input from the mobile terminal 20A with which communication has been established. Based on the copy job, the connection SSID determination part 15 determines an SSID of a connection destination (S203). The connection SSID determination part 15 determines, for example, the SSID of the connection destination by extracting SSID1 included in the copy job. The connection SSID determination part 15 outputs, for example, the extracted SSID1 to the access control part 23.

The access control part 23 confirms the billing group associated with SSID1 input from the connection SSID determination part 15 (S204). When an SSID1 is input from the connection SSID determination part 15, the control part 23 reads, for example, the usage history 121*a* associated with the input SSID1 from the billing management table 12B of the storage part 12. With these processes, the printer 10 turns from a job close status to a job open status in which the printer is able to receive a job input from the mobile terminal 20 or a job created by an operation of the user.

The control part 23 outputs the copy job acquired from the mobile terminal 20 via the communication part 11*a* and the image data obtained from the scanner part 22, to the printing part 18. Based on the copy job acquired from the mobile terminal 20 via the communication part 11*a* and the image data obtained by the scanner part 22, the printing part 18 generates a print image (S205). The printing part 18 outputs the generated print image to the control part 23. The control part 23 outputs the print image acquired from the printing part 18 to the color determination part 14. The color determination part 14 confirms the color page based on the print image input from the control part 23 (S206). The color determination part 14 determines, for example, whether each page is a color page or not in the print image, then outputs the determination result to the control part 23. The color determination part 14 outputs, for example, the number of color pages (color page output number) and the number of monochrome pages (monochrome page output number) included in the input print image to the control part 23 as the determination result. The control part 23 acquires the determination result from the color determination part 14.

The printing part 18 performs printing process using the generated print image (S207). The printing part 18 prints, for example, the toner image generated based on the print image on to a sheet and the like. In this way, copying is performed on the copying machine 70.

The control part 23 outputs the image processing job to the time management part 13. When an image processing job is input from the control part 23, the time management part 13 outputs the time the image processing job was input (that is, the time the image processing was performed on the printing part 18) to the control part 23. The control part 23 acquires the time input from the time management part 13 as the print completion date (S208).

The control part 23 outputs the determination result of the color determination part 14, the time generated by the time management part 13, and the SSID determined by the connection determination part 15, to the billing control part 16. The billing control part 16 updates the usage history 121 based on various information input from the control part 23 (the determination result of the color determination part 14, the time generated by the time management part 13, and the SSID determined by the connection SSID determination part 15). When a print on the printing part 18 includes color printing (S209; Y), the billing control part 16 updates the color page output number by adding the color page output number included in the determination result to the color page output number corresponding to the period (Date) including the time generated by the time management part 13, within the appropriate SSID usage history (S210). When a print on the printing part 18 includes monochrome printing (S209; N), the billing control part 16 updates the monochrome page output number by adding the monochrome page output number included in the determination result to the monochrome page output number corresponding to the period (Date) including the time generated by the time management part 13, within the appropriate SSID usage history (S211).

The usage history may be composed with a single billing datum for an entire period. It may be composed with several billing data which are segmented by a unit period, for example, every hour, AM/PM, every day, every week or every month etc.

The control part 23 records the time generated by the time management part 13 on the billing setting table 12A of the memory part 12 (S212). In the event the control part 23 acquires multiple print data, it will sequentially execute S205-S212 until all printing is complete (S213; N). The control part 23 completes the sequence of printing process when all printing is complete (S213; Y).

The control part 23 outputs the updated billing information 10A at a specified time (for example, a determined date and time each month) to the communication part 11*b*. The communication part 11*b* outputs the billing information 10A input from the control part 23 to the server device 30 via the network 60.

In this case, based on the updated billing information 10A, the control part 23 generates screen data for displaying the billing report, then outputs the screen data to the operation panel part 17. Based on the screen data input from the control part 23, the operation panel part 17 displays, for example, the screen 17B (interface) as illustrated in FIG. 7.

[Effects]

Next, an effect of the copying machine 70 is described.

Conventionally, an image processing apparatus, such as a printer, a scanner, a copying machine, a facsimile, or a multifunction machine that integrates functions of these apparatuses, that can receive a job from an external device such as a mobile terminal using a communication function such as Wi-Fi Direct and can execute copying, printing, scanning or the like has been on the market. However, for copying using an external device, it may be desirable to perform billing control. In this case, it was necessary to install a dedicated application to perform billing control on the external device, and this was troublesome.

On the other hand, in the present embodiment, multiple SSIDs and the usage history 121 associated with the multiple SSIDs are stored in the memory part 12 as the billing information 10A, and when a copy job is acquired from a mobile terminal 20 after communication has been established, the printing part 18 is controlled based on the copy job, and the usage history 121 associated with the SSID used to establish communication is updated. As such, the usage history 121 can be updated in correspondence with the printing part 18 based on the copy job. As a result, by having the billing information 10A including the updated usage history 121 output to the server device 30, billing process can be performed on the server device 30. Therefore, billing control related to an image processing job (for example, a copy job) can be easily performed without installing a dedicated application for performing billing control related to the image processing job (for example, a copy job) on a mobile terminal 20.

Further, in the present embodiment, in the event a copy job is acquired via the communication part 11*a* as the image processing job, the image data obtained by the scanner part 22 is output to the printing part 18, printing process using the image data is performed on the printing part 18, then the usage history 121 is updated based on the image data. As such, the usage history 121 can be updated in correspondence with the control of the printing part 18 based on the copy job. As a result, by having the billing information 10A including the updated usage history 121 output to the server device 30, billing process can be performed on the server device 30. Therefore, billing control related to an image processing job (for example, a copy job) can be easily performed without installing a dedicated application for performing billing control related to the image processing job (for example, a copy job) on a mobile terminal 20.

Figure 16:
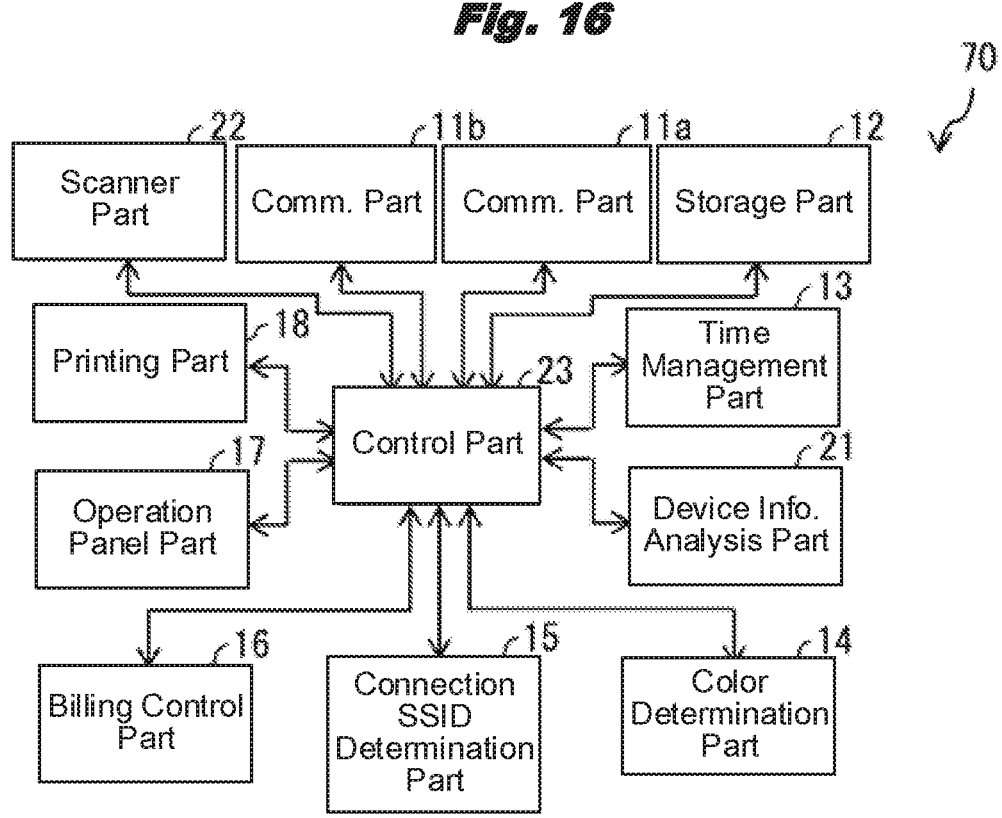
FIG. 16 illustrates a modified example of functional blocks of the copying machine in FIG. 14.

In the above second embodiment, the copying machine 70 may perform billing control for each device (mobile terminal 20). In this case, the copying machine 70 further has, for example, as illustrated in FIG. 16, a device information analysis part 21.

The device information analysis part 21 identifies, for example, a mobile terminal 20 using the MAC address which is the identifier of the mobile terminal 20. In this modified example, when the image processing job is a copy job including a MAC address and a SSID, the device information analysis part 21 will extract, for example, the MAC address included in the image processing job when an image processing job is input from the control part 23, then outputs the extracted MAC address to the control part 23.

In this modified example, the memory part 12 stores, for example, a billing setting table 12A as illustrated in FIG. 9 and a billing management table 12B as illustrated in FIG. 10, as the billing information 10A.

In this modified example, in the billing setting table 12A, for example, as illustrated in FIG. 9, multiple billing devices, multiple host names, multiple MAC addresses, multiple SSIDs, and multiple time information (Last Use Date) are set. In the billing setting table 12A, a host name, a MAC address, a SSID, and the time information (Last Use Date) are set for each billing device.

In this modified example, in the billing management table 12B, for example, as illustrated in FIG. 10, the usage history 121 associated with multiple billing devices (or multiple SSIDs) are set. In this modified example, the usage history 121 is set for each billing device (or SSID). The usage history 121 includes, for example, the usage history 121a associated with the first device (or SSID1), and the usage history 121b associated with the second device (or SSID2). That is, the memory part 12 stores the usage history 121a corresponding to the first device (or SSID1), as well as the usage history 121b corresponding to the second device (or SSID2).

In this way, in this modified example, billing control is performed for each device (a mobile terminal 20). Even under such circumstance, a similar effect as in the above second embodiment can be achieved.

In the above, the present disclosure was described by illustrating multiple embodiments as well as their modified examples. The present invention is not limited to these embodiments and the like, and various modifications are possible. The effects described in this specification are merely examples. The effects of the present invention are not limited to the effects described in this specification. The present invention may have effects other than the effects described in this specification.

What is claimed is:

1. An image processing apparatus, comprising:
a data processing part that processes image data,
a storage part that stores billing information including a plurality of wireless communication identifiers and usage histories of the data processing part, each of the usage histories being associated with wireless communication identifiers,
a communication part that establishes a wireless communication associated with one of the wireless communication identifiers such that the communication part wirelessly communicates with an external device, and
a control part that, when receiving an image processing job from the external device through the communication part,
determines one of the wireless communication identifiers that is used to establish the wireless communication, wherein the one of the wireless communication identifiers is defined as a destination identifier,
controls the data processing part based on the image processing job, and
updates one usage history that is associated with the destination identifier.

2. The image processing apparatus according to claim 1, wherein
the control part updates the one usage history in correspondence with a work amount of the data processing part.

3. The image processing apparatus according to claim 1, further comprising:
an output part that outputs the billing information to an external system.

4. The image processing apparatus according to claim 1, wherein
the image processing job is a print job that includes image data,
when receiving the print job through the communication part, the control part outputs the image data to the data processing part,
the data processing part executes a printing process using the image data input from the control part,
the control part updates the one usage history based on the image data.

5. The image processing apparatus according to claim 1, further comprising:
an imaging part that acquires the image data by imaging, wherein
the image processing job is a copy job,
when receiving the copy job through the communication part, the control part outputs the image data acquired by the imaging part to the data processing part,
the data processing part executes a printing process using the image data input from the control part,
the control part updates the one usage history based on the image data output to the data processing part.

6. The image processing apparatus according to claim 1, wherein
the one usage history includes a color page output number and a monochrome page output number.

7. The image processing apparatus according to claim 2, wherein
the control part counts how many sheets are used for completing the image processing job such that a page output number is calculated,
the control part separately counts the page output number for color printing and the page output number for monochrome printing, and
the work amount of the data processing part is composed with the page output numbers for color printing and monochrome printing.

8. The image processing apparatus according to claim 2, wherein
the wireless communication identifiers includes a first identifier and a second identifier,
the usage histories include a first usage history associated with the first identifier and a second usage history associated with the second identifier such that the storage part stores the first usage history and the second usage history, when receiving the image processing job, which contains the image data, through the wireless communication that is established using the first identifier, the control part updates the first usage history based on the work amount of the data processing part wherein the work amount is calculated with the image data, and when receiving the image processing job, which contains the image data, through the wireless communication that is established using the second identifier, the control part updates the second usage history based on the work amount of the data processing part wherein the work amount is calculated with the image data.

9. The image processing apparatus according to claim 8, wherein the external device is designated to the first identifier such that the image data sent from the external device is associated with the first identifier, another external device is designated to second identifier such that the image data sent from the another external device is associated with the second identifier, the output system separately issues first billing information containing the first usage history and second billing information containing the second usage history at an every unit period.

10. An image processing method executed in an image processing apparatus that establishes a wireless communication with an external device, comprising:

establishing the wireless communication using either a first identifier or a second identifier, which is different from the first identifier, that are wireless communication identifiers, storing billing information containing a first usage history associated with the first identifier and a second usage history associated with the second identifier, when receiving an image processing job, which contains an image data, with the first identifier, updating the first usage history based on the image data of the image processing job, when receiving an image processing job, which contains an image data, with the second identifier, updating the second usage history based on the image data of the image processing job.

* * * * *